(12) United States Patent
Pedersen

(10) Patent No.: US 11,491,747 B2
(45) Date of Patent: Nov. 8, 2022

(54) PULTRUSION METHOD AND APPARATUS

(71) Applicant: Siemens Gamesa Renewable Energy A/S, Brande (DK)

(72) Inventor: David Stien Pedersen, Aalborg (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 576 days.

(21) Appl. No.: 16/411,382

(22) Filed: May 14, 2019

(65) Prior Publication Data

US 2019/0351629 A1 Nov. 21, 2019

(30) Foreign Application Priority Data

May 17, 2018 (EP) ..................... 18172948

(51) Int. Cl.
*B29C 70/52* (2006.01)
*B29B 15/12* (2006.01)
*B29C 70/88* (2006.01)

(52) U.S. Cl.
CPC .......... *B29C 70/521* (2013.01); *B29B 15/122* (2013.01); *B29C 70/526* (2013.01); *B29C 70/88* (2013.01); *B29C 70/527* (2013.01); *B29K 2995/0005* (2013.01)

(58) Field of Classification Search
CPC ............ B29C 70/52–528; B29C 70/88; B29K 2105/002; B29L 2031/085
See application file for complete search history.

(56) References Cited

U.S. PATENT DOCUMENTS

| | | | | |
|---|---|---|---|---|
| 3,042,570 A | * | 7/1962 | Bradt ..................... | B29C 70/52 264/171.13 |
| 3,954,379 A | * | 5/1976 | Klocke .................. | B29C 70/08 425/505 |
| 5,366,773 A | * | 11/1994 | Schroll ................. | B29C 70/525 156/166 |
| 5,721,047 A | | 2/1998 | Thicthener et al. | |
| 6,556,779 B1 | | 4/2003 | Stabile | |
| 2009/0246521 A1 | | 10/2009 | Swift et al. | |
| 2010/0314028 A1 | * | 12/2010 | Hedges ................. | B29C 70/083 156/93 |

(Continued)

FOREIGN PATENT DOCUMENTS

| | | |
|---|---|---|
| CN | 101546618 A | 9/2009 |
| CN | 102797185 A | 11/2012 |

(Continued)

OTHER PUBLICATIONS

Office Action in corresponding Chinese Patent Application No. 201910414118.1 dated Dec. 4, 2020. 8 pages.

(Continued)

*Primary Examiner* — Jeffrey M Wollschlager
(74) *Attorney, Agent, or Firm* — Schmeiser, Olsen & Watts LLP

(57) ABSTRACT

Provided is a method of manufacturing a pultruded strip for an elongate structure. The method includes the step of: providing a pultrusion apparatus including at least a pultrusion die through which a plurality of fibers are pulled to be soaked in a resin, and changing the conduction properties of selected points along the plurality of fibers upstream the pultrusion die.

10 Claims, 2 Drawing Sheets

(56) References Cited

U.S. PATENT DOCUMENTS

| | | | | |
|---|---|---|---|---|
| 2013/0167502 A1* | 7/2013 | Wilson | ............... | B29C 70/025 |
| | | | | 57/210 |
| 2015/0210039 A1* | 7/2015 | Simmons | ............... | B82Y 30/00 |
| | | | | 428/172 |
| 2017/0274561 A1* | 9/2017 | Ong | ............... | B29B 15/122 |
| 2018/0036971 A1 | 2/2018 | Keil | | |
| 2020/0269523 A1* | 8/2020 | Chen | ............... | B29C 70/226 |

FOREIGN PATENT DOCUMENTS

| | | | |
|---|---|---|---|
| CN | 105199379 A | 12/2015 | |
| DE | 10014376 A1 | 7/2001 | |
| EP | 2004009646 A2 | 1/2004 | |
| EP | 1842657 A2 | 10/2007 | |
| EP | 2228803 A2 | 9/2010 | |
| EP | 3106291 A2 | 12/2016 | |
| TW | 510146 B | 11/2002 | |
| WO | WO 2004009646 A2 | 1/2004 | |
| WO | 2017071594 A1 | 5/2017 | |

OTHER PUBLICATIONS

European Search Report for application No. 18172948.4 dated Nov. 20, 2018.

* cited by examiner

PULTRUSION METHOD AND APPARATUS

CROSS-REFERENCE TO RELATED APPLICATIONS

This application claims priority to European Application No. 18172948.4, having a filing date of May 17, 2018, the entire contents of which are hereby incorporated by reference.

FIELD OF INVENTION

The following relates to a pultrusion method and apparatus for manufacturing a pultruded strip for an elongate structure.

BACKGROUND

Carbon parts are normally used in various industrial fields. For example, carbon parts may be used in manufacturing blades for wind turbines to be able to make them longer and less heavy compared to blades manufactured using glass fiber material only. Such carbon parts may be typically manufactured through a pultrusion process.

In constructions of great dimensions like wind turbine, electrically conducting parts normally need to be electrical connected to the lightning protection system, including carbon parts of wind turbine blades, because carbon is an electrical conducting material.

Carbon profiles have normally some conductivity along the fiber direction, but across the fiber the conductivity is much lower. This is in particular due to the sizing of the isolation provided on each fiber, the very thin isolator gives a weak connection to the fiber next to it. On microscopic level the sizing of the fiber is setting the limit of conductivity. As a macroscopic result this makes it difficult to connect the carbon profiles to the lightning cable used for lightning protection of a wind turbine blade, because the power of a lightning cannot move fast enough out through the profile.

Improving the conductivities in the profile is important in order to avoid such drawback. When the conductivity across the fiber of a single profile is improved, it is also possible to provide a much simpler connection can be chosen for assuring a convenient lightning protection.

One solution for the above problem may be that to use a conductive glue during the manufacturing process to improve both the conductivities in the profiles and between them. Such conductive glue may be provided between the fibers in a pultrusion process. Inconveniences of such solutions are that know conductive glues show poorer properties than non-conductive glues in terms of casting time and adhesive capacities.

It is therefore still needed to provide a manufacturing method and apparatus for manufacturing a pultruded strip for an elongate structure, where the electrical conductivity in the pultruded strip the carbon parts is improved, without the inconveniences above described with reference to the known prior art.

SUMMARY

According to a first aspect of the embodiments of the invention, a method of manufacturing a pultruded strip for an elongate structure is provided. The method includes the step of:

providing a pultrusion apparatus including at least a pultrusion die through which a plurality of fibers are pulled to be soaked in a resin, changing the conduction properties of selected points along said plurality of fibers upstream the pultrusion die.

According to a second aspect of the embodiments of the invention, a pultrusion apparatus is provided, which comprises at least a pultrusion die through which a plurality of fibers are pulled to be soaked in a resin, and a roving section upstream the pultrusion die for changing the conduction properties of selected points along said plurality of fibers.

The method and apparatus and method of the present embodiments of the invention advantageously solves the inconveniences of the prior art, by improving the conductivities of the elongated structure by changing the conduction properties in a limited number of selected points. This improves the conduction properties of the elongated structure without compromising the mechanical properties thereof.

According to embodiments of the present invention, changing the conduction properties of selected points along said plurality of fibers is performed by injecting or depositing drops of a conductive glue. This may be achieved by providing the roving section of the above defined pultrusion apparatus with one or more nozzles for injecting or depositing drops of a conductive glue selected points along said plurality of fibers.

According to embodiments of the present invention, changing the conduction properties of selected points along said plurality of fibers is performed by changing the size of the fibers.

In particular, the size or the surface of the fibers may be changed by mashing or squeezing. The mashing or squeezing of the fibers interrupt the covering surface of the fibers and expose the carbon core to the exterior and thus locally improving the conductivity. This will give contact to the carbon fiber and between the carbon fibers.

This may be achieved by providing the roving section of the above defined pultrusion apparatus with one or more devices for mashing or squeezing the fibers in selected points along said plurality of fibers.

Such one or more devices may comprise a rotating wheel and a stationary plate contacting each other for mashing or squeezing the fibers in selected points along said plurality of fibers.

According to embodiments of the present invention, the rotating wheel comprises a plurality of radial protrusions regularly distributed about a rotating axis of the rotating wheel) and the stationary plate comprises an uneven surface, the plurality of radial protrusions and the uneven surface contacting each other for mashing or squeezing the fibers) in selected points along said plurality of fibers.

The plurality of radial protrusions may be made of soft material or, alternatively, the wheel may be provided with an elastic support.

The present embodiments of the invention may be advantageously used to manufacture an elongate structure to be integrated in a wind turbine blade.

It has to be noted that embodiments of the invention have been described with reference to different subject matters. In particular, some embodiments have been described with reference to apparatus (pultrusion tool and apparatus) type claims whereas other embodiments have been described with reference to method type claims. However, a person skilled in the art will gather from the above and the following description that, unless other notified, in addition to any combination of features belonging to one type of subject matter also any combination between features relating to different subject matters, in particular between features of the method type claims and features of the apparatus type claims is considered as to be disclosed with this document.

BRIEF DESCRIPTION

Some of the embodiments will be described in detail, with references to the following Figures, wherein like designations denote like members, wherein.

DETAILED DESCRIPTION

Figure 1:
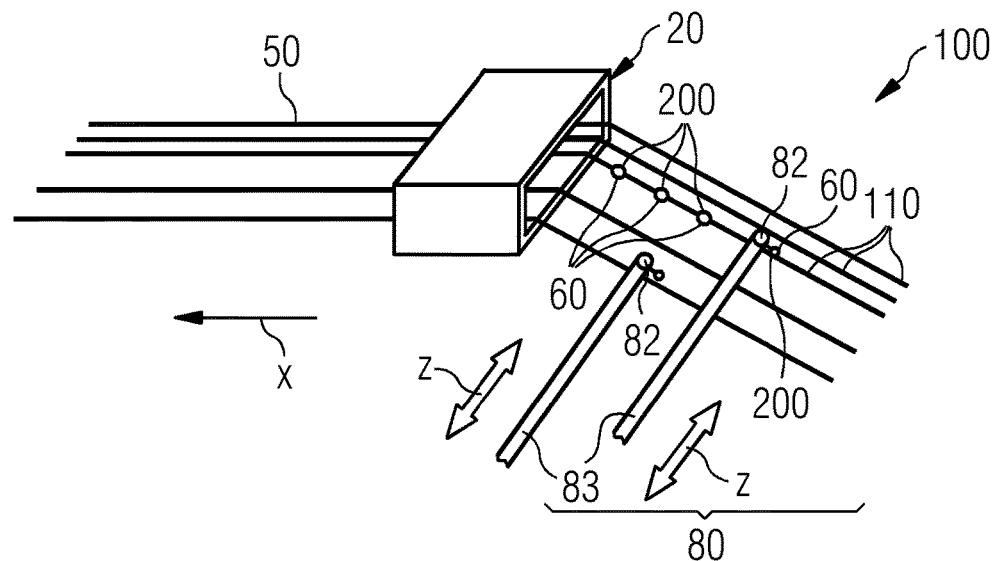
FIG. 1 shows a schematic layout of a portion of a first embodiment of a pultrusion apparatus.

The illustrations in the drawings are schematic. It is noted that in different figures, similar or identical elements are provided with the same reference signs.

FIG. 1 shows a first embodiment of a pultrusion apparatus 100 extending along a longitudinal pultrusion direction X. The pultrusion apparatus 100 comprises a pultrusion die 20 through which a plurality of fibers 110 are pulled to be soaked in a resin.

The pultrusion die 20 has a rectangular cross-section.

The pultrusion die 20 is conventional and already known in the pultrusion technical field and therefore not described in further detail.

With reference to the pultrusion direction X, downstream the pultrusion die 20 at least a partially formed pultruded strip 50 is delivered.

With reference to the pultrusion direction X, upstream the pultrusion die 20 a roving section 80 is provided. In the roving section 80 a plurality of fibers 110, for example coming from a plurality of fiber bobbins (not shown), are collected and led towards the pultrusion die 20.

The roving section 80 may be used to change the conduction properties of selected points 200 along the plurality of fibers 110 upstream the pultrusion die 20, i.e. before they enter the pultrusion die 20.

The points 200 can be selected according to a plurality of criteria, for example they be uniformly distributed along the plurality of fibers 110.

To such purpose, the roving section 80 comprises one or more nozzles 82 (two nozzles 82 in the embodiment of FIG. 1) for injecting or depositing drops 60 of a conductive glue selected points 200 along the plurality of fibers 110. The nozzles are mounted on a plurality of respective arms 83, which are movable according to a direction Z, transversal to the pultrusion direction X, to reach the selected points 200 the plurality of fibers 110.

According to other embodiments of the present invention, the arms 83 may be movable on a plane or on a three-dimensional space.

The arms 83 may be movable above or below the plurality of fibers 110.

By injecting or depositing drops 60 of a conductive glue at the selected points 200 along the plurality of fibers 110, the conduction properties at the pultruded strip 50 are changed locally. The drops 50 of conductive glue provide a local connection between adjacent fibers 110 which improve the overall conductivity of the pultruded strip 50.

Figure 2:
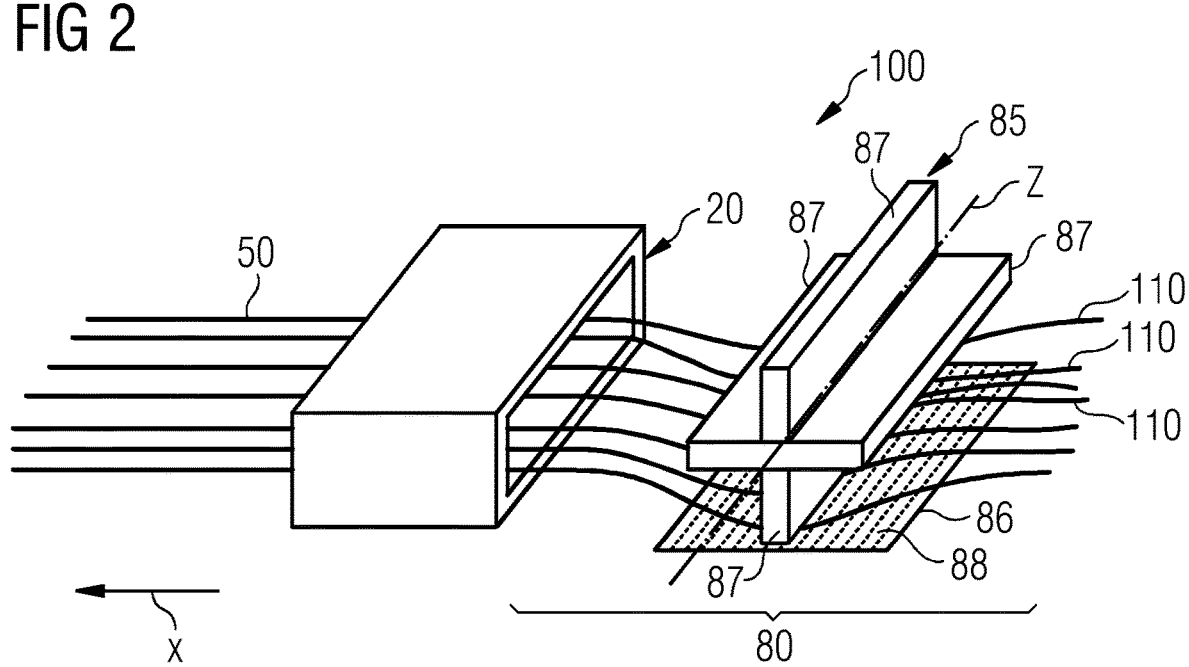
FIG. 2 shows a schematic layout of a portion of a second embodiment of a pultrusion apparatus.

FIG. 2 shows a second embodiment of a pultrusion apparatus 100 extending along a longitudinal pultrusion direction X. According to the second embodiment, changing the conduction properties of selected points 200 along said plurality of fibers 110 is performed by changing the size or the surface of the fibers 110 in the selected points 200. In particular, changing the size or the surface of the fibers may be performed by mashing or squeezing. The smashing or squeezing of the fibers interrupts the covering surface of the fibers 110, which has poor conductive properties. Removing or breaking the covering surface of the fibers 110 exposes the carbon core to the exterior and thus locally improves the conductivity of the pultruded strip 50.

To such purpose, in such embodiment the roving section 80 comprises a wheel 85 rotating around a rotating axis Z, transversal to the pultrusion direction X, and a stationary plate 86. The wheel 85 comprises a plurality of radial protrusions 87, regularly distributed about the rotating axis Z (four radial protrusions 87 in a cross configuration, at regular angular distances of 90 deg from each other). The radial protrusions 87 are made of soft material, for example a soft plastic material. The stationary plate 86 is provided with an uneven rigid surface 88 having a plurality of discontinuities. For example, the surface 88 may be made of sand surface. In the roving section 80 the fibers 110 passes between the wheel 85 and the stationary plate 86. The mutual distance between the wheel 85 and the stationary plate 86 is chosen in such a way that, during the rotation of the wheel 85 around the rotational axis Z, the fibers 110 are periodically pinched between each of the radial protrusions 87 and the uneven rigid surface 88 at the selected points 200. The irregularities of the rigid surface 88 causes the covers of the fibers 110 to crack, thus exposing the carbon core to the exterior. The soft material of the radial protrusions 87 prevents the fibers 110 from completely breaking. Alternatively the radial protrusions 87 may be made of an hard material and the wheel 85 provided with an elastic support, which is able to limit pressure and friction between the arms and the stationary plate 86, with the same purpose of preventing the fibers 110 from breaking.

Figure 3:
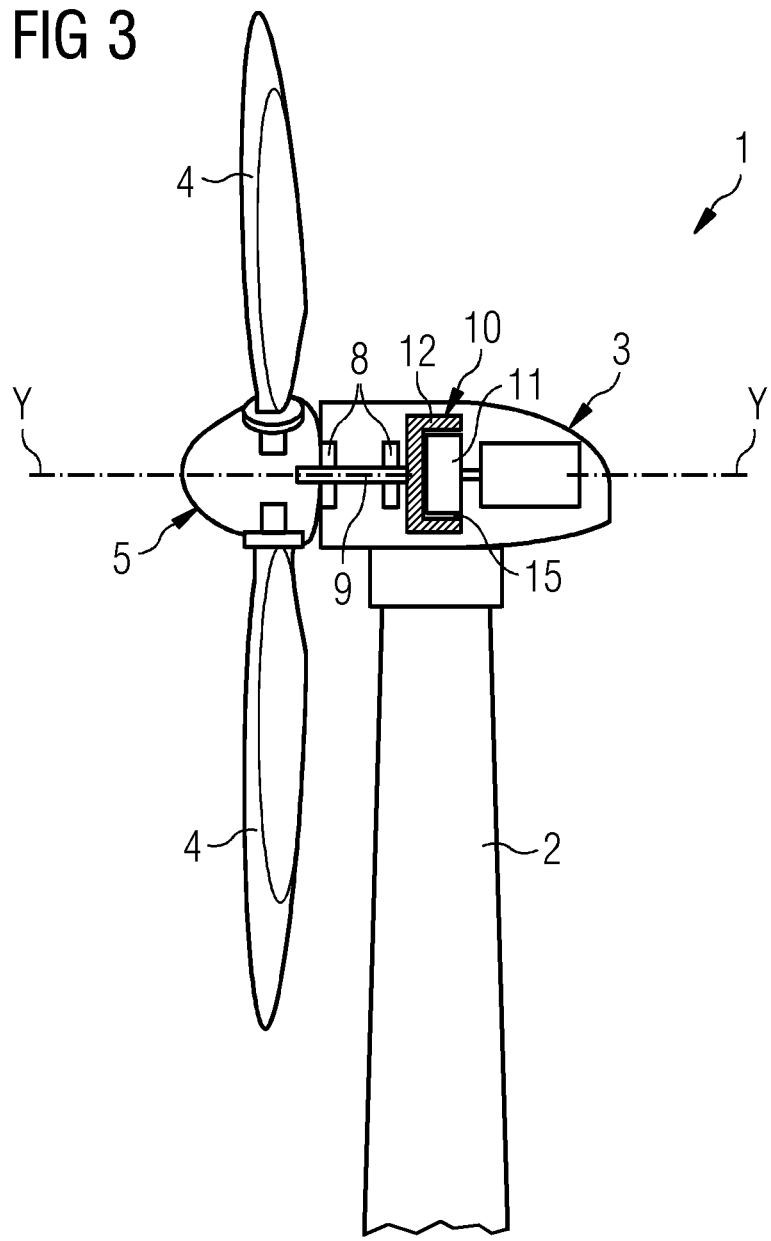
FIG. 3 shows a schematic section of a wind turbine including a component according to tan embodiment of the present invention.

FIG. 3 shows a wind turbine 1 including components according to the embodiments of the invention. The wind turbine 1 comprises a tower 2, which is mounted on a non-depicted fundament. A nacelle 3 is arranged on top of the tower 2.

The wind turbine 1 further comprises a wind rotor 5 having two, three or more blades 4 (in the perspective of FIG. 1 only two blades 4 are visible). The wind rotor 5 is rotatable around a rotational axis Y. The blades 4 extend radially with respect to the rotational axis Y.

The wind rotor 5 is rotationally coupled with an electric generator 30 by means of a rotatable main shaft 9.

According to other possible embodiments of the present invention (not represented in the attached figures), the wind rotor 5 is rotationally coupled directly with the electric generator 30 (direct-drive generator configuration).

A schematically depicted bearing assembly 8 is provided in order to hold in place the rotor 5. The rotatable main shaft 9 extends along the rotational axis Y.

The blades 4 comprise one or more elongated structure 50 obtained through the present embodiments of the invention.

Although the present invention has been disclosed in the form of preferred embodiments and variations thereon, it will be understood that numerous additional modifications and variations could be made thereto without departing from the scope of the invention.

For the sake of clarity, it is to be understood that the use of 'a' or 'an' throughout this application does not exclude a plurality, and 'comprising' does not exclude other steps or elements.

The invention claimed is:

1. A method of manufacturing a pultruded strip for an elongate structure, the method comprising:
   providing a pultrusion apparatus including at least a pultrusion die through which a plurality of fibers are pulled to be soaked in a resin; and
   changing conduction properties of selected points along the plurality of fibers upstream from the pultrusion die by injecting or depositing discrete drops of a conductive glue onto the plurality of fibers.

2. The method of manufacturing as claimed in claim 1, wherein the elongate structure is a portion of a wind turbine blade.

3. The method of manufacturing according to claim 1, wherein the plurality of fibers are spaced apart from each other during the changing of conduction properties.

4. The method of manufacturing according to claim 1, wherein a selected point along an individual fiber is a discrete location on the individual fiber, and areas of the individual fiber adjacent to the selected point remain unchanged.

5. The method of manufacturing according to claim 1, wherein a plurality of nozzles are used to inject or deposit the discrete drops of conductive glue.

6. A method of manufacturing a pultruded strip for an elongate structure, the method comprising:
   providing a pultrusion apparatus including at least a pultrusion die through which a plurality of fibers are pulled to be soaked in a resin; and
   changing conduction properties of selected points along individual fibers of the plurality of fibers upstream from the pultrusion die by: (i) mashing or squeezing the plurality of fibers to change a size of the plurality of fibers, or (ii) locally removing or breaking a covering surface of at least one of the plurality of fibers to change the size;
   wherein the mashing and squeezing the plurality of fibers, or the locally removing or breaking the covering surface, is a function of the individual fibers being physically pinched between two surfaces.

7. The method of manufacturing as claimed in claim 6, wherein the elongate structure is a portion of a wind turbine blade.

8. The method of manufacturing according to claim 6, wherein the plurality of fibers are spaced apart from each other during the changing of conduction properties.

9. The method of manufacturing according to claim 6, wherein the changing conduction properties of selected points along the plurality of fibers occurs when the covering surface of the plurality of fibers is broken.

10. The method of manufacturing according to claim 6, wherein a selected point along an individual fiber is a discrete location on the individual fiber, and areas of the individual fiber adjacent to the selected point remain unchanged.

* * * * *